United States Patent
Ihara et al.

(10) Patent No.: US 6,666,675 B2
(45) Date of Patent: Dec. 23, 2003

(54) INJECTION MOLDING NOZZLE FOR RESIN OF HIGHLY TEMPERATURE-DEPENDENT VISCOSITY

(75) Inventors: Hirokazu Ihara, Nagano-ken (JP); Nobuyuki Kawahara, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 39 days.

(21) Appl. No.: 10/059,504

(22) Filed: Jan. 29, 2002

(65) Prior Publication Data

US 2002/0102323 A1 Aug. 1, 2002

(30) Foreign Application Priority Data

Jan. 30, 2001 (JP) .......................................... 2001-021788

(51) Int. Cl.[7] .............................................. B29C 45/20
(52) U.S. Cl. ................................... 425/549; 264/328.15
(58) Field of Search ................................. 425/549, 130; 264/328.15

(56) References Cited

U.S. PATENT DOCUMENTS 6,432,350 B1 * 8/2002 Seres et al. .................. 425/130

* cited by examiner

Primary Examiner—Tim Heitbrink
(74) Attorney, Agent, or Firm—Weingarten, Schurgin, Gagnebin & Lebovici LLP

(57) ABSTRACT

The purpose of the present invention is to provide a nozzle for resins having a highly temperature-dependent viscosity by dividing the nozzle into a nozzle tip and a nozzle main body, and limiting a passage of a tapered hole formed in the nozzle main body, a gradient of a nozzle port, a passage volume, or the like within specific ranges. The passage 13 in the nozzle main body 1 is formed of a tapered hole with a gentle gradient without a step. The nozzle tip is made of low thermal conductivity metal. The nozzle port at the center of the nozzle tip is formed of a tapered hole. The internal side diameter and the diameter of the front end hole 13a of the passage 13 are set within the range of 0.9–1.5 mm capable of preventing a dropping phenomenon without causing a large pressure loss. The passage volume is limited to 1.0 cm$^3$ or less within the range of 70–115 mm in length of the nozzle main body 1.

10 Claims, 1 Drawing Sheet

INJECTION MOLDING NOZZLE FOR RESIN OF HIGHLY TEMPERATURE-DEPENDENT VISCOSITY

BACKGROUND OF THE INVENTION

1. Field of the Invention

The present invention relates to a nozzle suitable for injection molding of resin of highly temperature-dependent viscosity such as liquid crystal polymer.

2. Detailed Description of the Prior Art

As molding materials of components for electronic equipment, resins such as liquid crystal polymer (LCP), high heat-resisting and low moisture-absorbing nylons (PA46), (PA6T), (PA9T), and polyphenylene-sulfide (PPS).

Since any of these resins has highly temperature-dependent viscosity and slight temperature lowering at the time of injection molding causes a sudden change in viscosity to affect on the fluidity, the temperature control of the resin is very important for stable molding.

In injection molding of liquid crystal polymer, the temperature of the nozzle main body is maintained at approximately 360° C. at which the polymer has sufficient fluidity. However, the front end of nozzle comes into contact with a sprue bush of a low temperature metallic mold (for example, 80° C.), and the front end of nozzle is deprived of heat and cooled down to approximately 270° C.

Therefore, the resin in the nozzle port solidifies due to the temperature lowering of the front end of the nozzle, and becomes one piece with the sprue, and this is cleanly drawn out of the smallest diameter part on the boundary of the passage by mold opening after injection and cooling, to be removed from the nozzle port. Moreover, the melting resin is maintained in the passage inside of the boundary until the next injection without being extruded to the front end side.

When the temperature of the front end of nozzle is too high in such a state, the resin in the nozzle port is imperfectly solidified and cannot be drawn out of the boundary by mold opening, but is drawn out as it is torn off halfway and partly stays in the nozzle port. The remaining part is cooled down and solidified before the next injection and stays to choke the nozzle port. For this reason, the remaining part is injected into the metallic mold in the solidified state when infecting new resin.

When the temperature of the resin collected near the boundary of the passage is too high, the resin flows into the nozzle port before the next injection, and further flows into the sprue bush of the next metallic mold and cooled down for being solidified. Such outflow of the resin is called dropping, and if the solidified resin is injected at the next cycle, it is packed in a gate or narrow parts of a product and causes a short shot.

In order to avoid the dropping, the molding is carried out at a temperature lowered by 20° C. at a molding site. However, resin of highly temperature-dependent viscosity is increased in viscosity in the flow passage and decreased in fluidity, and this causes difficulty in filling the resin into narrow cavity gap in molding of a molded article with thin walls and results in a short shot.

Temperature control is only the way to prevent such a short shot from occurring, and this means that the molding needs to be carried out under such a severe temperature control as the resin temperature at the boundary between the nozzle port and the passage has to be maintained in a temperature range not to cause dropping, and also has to be maintained in a temperature range not to cause lowering in fluidity.

Therefore, considering easiness of the temperature control and prevention of the dropping, the nozzle was divided into a nozzle tip and a nozzle main body; the resin was prevented from staying by forming the passage of the main body in a form of a tapered hole; such a dropping-preventive nozzle was developed by limiting the nozzle port diameter to a small one; and each kind of resins mentioned above was injection-molded into connectors by using an injection molding machine mounted with the nozzle, and as a result, it has been found out that the nozzle can be applied to many resins of highly temperature-dependent viscosity as far as the passage, the gradient of the nozzle port, the passage volume, etc. are within specific ranges.

Therefore, the purpose of the present invention is to provide a new nozzle for injection molding permitting to perform stable injection molding of even a small capacity product by making a nozzle, which is divided into the nozzle tip and the nozzle main body and in which the passage in the main body is formed of a tapered hole, as a nozzle for general use to be applicable to the resin of highly temperature-dependent viscosity by restricting the gradients of the passage and the nozzle port, the passage volume, etc. within specific ranges.

SUMMARY OF THE INVENTION

The present invention for the above-mentioned purpose is such that the nozzle comprises a cylindrical nozzle main body of which both center parts of the front end and the rear end are formed into thread shafts and the internal center passage is formed of a smoothly tapered hole with a gentle gradient, a cap shape nozzle tip which has a nozzle port of a tapered hole with a diameter of the inside smaller than a diameter of the outside and which is made of low thermal conductivity metal mounted on the nozzle main body by screwing the inside thread on the above-mentioned thread shaft on the front end, and a heating means on the outer periphery of the above-mentioned nozzle main body, and that the above-mentioned nozzle port diameter on the inside and the hole diameter at the front end of the passage of the above-mentioned nozzle main body are set within the range of 0.9–1.5 mm capable of preventing the dropping phenomenon without a large pressure loss; the passage volume is limited to 1.0 cm$^3$ or smaller within the range of 70–115 mm of the nozzle main body length; and moreover, the hole diameter of the passage at the front end of the above-mentioned nozzle main body is set within the range of 0.9–1.2 mm for liquid crystal polymer resin, and within the range of 1.2–1.5 mm for polyphenylene-sulfide resin.

Moreover, the present invention is such that the diameter of the rear end hole of the above-mentioned passage is limited within 4–6 mm; the gradient up to the tip end hole is set within the range of $1/16.5$–$1/33$; and the passage wall is mirror-finished to prevent the resin from staying therein, and also the gradient of the nozzle port of the above-mentioned nozzle tip is set to $1/5$–$1/15$ which is steeper than that of the passage, so that the solidified resin in the above-mentioned nozzle port is thoroughly drawn out and removed.

Further, according to the present invention, a heat insulating board with a through-hole of the same diameter at the center as the diameter of the front end hole of the above-mentioned passage and the internal side diameter of the above-mentioned nozzle port is arranged between the front end face of the above-mentioned nozzle main body and the above-mentioned nozzle tip.

DETAILED DESCRIPTION OF THE PREFERRED EMBODIMENT

Figure 1:
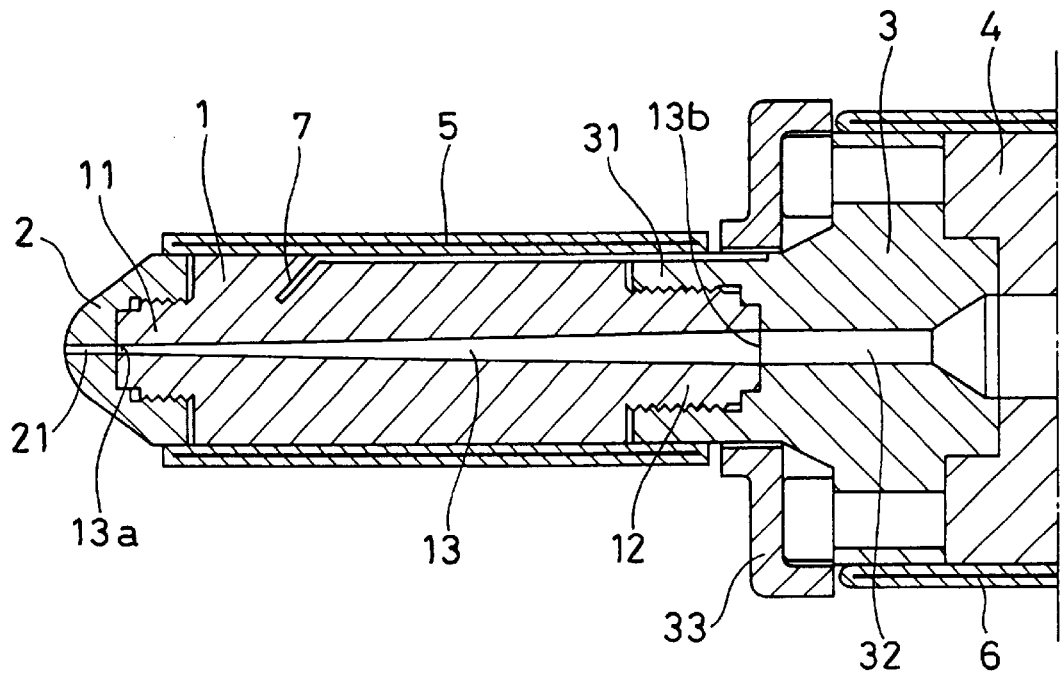
FIG. 1. a drawing of a longitudinal section of the nozzle for injection molding in the 1st embodiment in accordance with the present invention.

The cylindrical nozzle main body is shown by 1 in the figure, and the thread shafts 11, 12 are protrusively formed in both center parts of the front and rear ends, and the passage 13 for the resin is drilled through the center. The passage 13 is formed as a smoothly drilled tapered hole from the end face of the rear end thread shaft 12 up to the end face of the front end thread shaft 11 and the passage wall is mirror-finished so that the resin is prevented from staying therein.

The mark 2 is the nozzle tip, and it is made of low thermal conductivity metal to be formed in a cap shape and is provided with the nozzle port 21 of a tapered hole having the same diameter as that of the front end hole 13a of the above-mentioned passage 13. Moreover, in the inner periphery is cut an internal thread to be screwed on the front end thread shaft 11 of the above-mentioned nozzle main body 1.

The mark 3 is the head part of the heating cylinder 4, and a nozzle connection cylinder 31 having a internal thread cut in an inner periphery thereof is protrusively formed outside in the center thereof, and in the center part thereof, a passage hole 32 is drilled, which is connected with the rear end hole 13b of the above-mentioned passage 13 and makes the internal part of the heating cylinder 4 and the passage 13 communicate with each other. Moreover, the outside is provided with a thermal insulating material 33.

The mark 5 is the heating means on the outside wall of the nozzle main body 1 and 6 is a heating means on the outside wall of the heating cylinder, and they are constituted of band heaters of a normal structure. The mark 7 is a temperature detector probe embedded in the nozzle main body.

The injection nozzle illustrated in FIG. 1 is constructed by hermetically mounting the above-mentioned nozzle tip 2 on the front end of the nozzle main body 1 by screwing the internal thread of the inside peripheral wall with the above-mentioned external thread shaft 11. Therefore, making the joint of the nozzle main body 1 and the nozzle tip 2 border, it becomes possible not only to maintain a set temperature on the side of the nozzle main body 1 but also to maintain a solidifying temperature of resin on the side of the nozzle tip 2, and further to suppress the dropping phenomena of resin after injection by the front end hole 13a which is the smallest diameter part of the passage 13 at the boundary.

Figure 2:
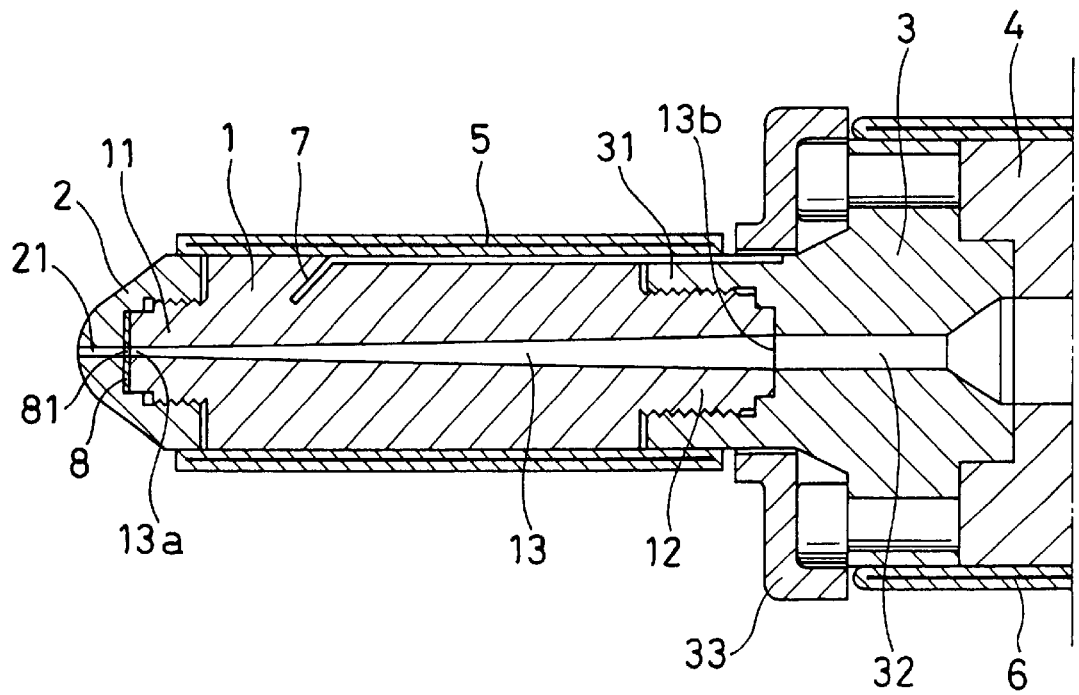
FIG. 2. a drawing of a longitudinal section of a nozzle for injection molding in the 2nd embodiment.

The embodiment illustrated in FIG. 2 shows an injection nozzle further decreased in a temperature change caused by mutual thermal interference by interposing a heat insulating board 8 of ceramics or the like at the joint of the nozzle main body 1 and the nozzle tip 2, and the heat insulating board 8 comprises a disk body as large as the end face of the thread shaft 11 in size, a through-hole 81 of the same diameter as the front end hole 13a of the above-mentioned passage 13 and the inside diameter of the nozzle port 21 is drilled at the center thereof.

Normally, the more effectively dropping, cobwebbing, or the like are prevented, the smaller the diameter of the front end hole of the passage 13 is, however, if it is made too small, resin is increased in flow resistance to cause a larger pressure loss at the time of filling the injection, and such inconvenience arises as the injection pressure has to be set higher than necessary and a preset injection speed cannot be obtained.

In addition, since each resin has different temperature dependency of viscosity, it is necessary to set the diameter of the front end hole 13a of the passage 13 considering generality to plural different resins. However, the diameter of the rear end hole 13b may be set within the range of 4–6 mm connectable to the above-mentioned passage hole 32 of the heating cylinder 4 without a step, and then, such a setting permits to be applicable to all resins adopted therefor.

For the reasons described above, injection was repeatedly tested on each resin of liquid crystal polymer, a high heat resistant low hygroscopic nylon, and a polyphenylene-sulfide, variously changing the gradient of the passage 13 and the diameter of the front end hole 13a, and as a result, it has been found out that the dropping does not occur when the diameter of the front end hole 13a is set to 0.9–2 mm for the liquid crystal polymer, and 1.2–1.5 mm for the polyphenylen sulfice, namely, when the hole diameter is set within the range of 1.2±0.3 mm, and that an injection speed can be obtained as preset without a very large pressure loss when the gradient of the passage 13 is set to be gentle, preferably, in the range of $1/16.6$–$1/33$, and that settings within those ranges are also applicable to the high heat resistant low hygroscopic nylon.

Furthermore, it is preferable to make it possible to increase a heating efficiency of the resin in the passage by limiting the passage volume to 1.0 cm$^3$ or less within the range of 70–115 mm of the nozzle main body length, and when the passage volume is 1.0 cm$^3$ or less, it is possible to uniformly heat the resin at a set temperature and maintain it until the next injection, and thus, the fluidity is prevented from lowering due to variation in temperature of the resin during its stay in the passage 13, and a short shot due to lowering of the fluidity becomes resistant to occurring.

In any of the above-mentioned embodiments, and in the configuration, the above-mentioned passage 13 is formed in a gentle gradient tapered hole and the front end hole 13a is set to be of a hole diameter hard to cause dropping; the nozzle tip 2 is made of metal with thermal conductivity lower than that of the metal of the nozzle main body 1; and cooling received from the mold side at the time of nozzle-touching is suppressed by the nozzle tip 2 and further the heat insulating board 8, the temperature can be maintained on the side of the nozzle tip 2 bounded by the front end hole 13a of the smallest hole diameter of the passage. It is not necessary to set the nozzle main body 1 at a low temperature to avoid the dropping phenomenon in such a conventional case because there is not a very large pressure loss at the time of injection; and the temperature control is facilitated. Therefore, it is possible to injection-mold resin having a very highly temperature-dependent viscosity under the state of a favorable speed and pressure by setting to the temperature higher than conventional one (for example, 20° C. or higher).

What is claimed is:

1. An injection-molding nozzle for resin of highly temperature-dependent viscosity, comprising a cylindrical nozzle main body of which both of middle parts of the front end and rear end are formed into thread shafts and of which an internal center passage is formed of a gently tapered hole; a nozzle tip made of low heat conductivity metal which has a nozzle port of a cap shape and has a tapered hole having an internal side diameter smaller than an exterior side diameter at the center thereof and which is fastened to the nozzle main body by screwing the threads of an inside wall thereof onto said front end thread shaft; and a heating means on the outside wall of said nozzle, characterized in that the internal diameter of said nozzle port and the diameter of the front end hole of the passage of the nozzle main body are set to a range of 0.9–1.5 mm capable of preventing a dropping phenomenon of resin without causing a large pressure loss, and a passage volume is no more than 1.0 cm³ within 70–115 mm in length range of the nozzle main body.

2. An injection-molding nozzle for resin of highly temperature-dependent viscosity as claimed in claim 1, characterized in that the diameter of the front end hole of the passage of said nozzle main body is set to a range of 0.9–1.2 mm when the resin is liquid crystal polymer.

3. An injection-molding nozzle for resin with highly temperature-dependent viscosity as claimed in claim 1, characterized in that the diameter of the front end hole of the passage of said nozzle main body is set to a range of 1.2–1.5 mm when the resin is polyphenylene-sulfide.

4. An injection-molding nozzle for resin with highly temperature-dependent viscosity as claimed in claim 1, characterized in that the diameter of the rear end hole of said passage is limited to 4–6 mm; the gradient up to said front end hole is set within a range of $1/16.5$–$1/33$; the passage surface is mirror-finished; and thereby the resin is prevented from staying inside, and moreover, the nozzle port of said nozzle tip is set to a gradient of $1/5$–$1/15$ steeper than that of the passage so that the solidified resin in said passage is thoroughly drawn and removed.

5. An injection-molding nozzle for resin with highly temperature-dependent viscosity as claimed in claim 1, characterized in that a heat insulating board provided with a through-hole of the same diameter drilled at the center as the diameter of the front end hole of said passage and the internal diameter of said nozzle port is interposed between the front end face of said nozzle main body and said nozzle tip.

6. An injection-molding nozzle for resin with highly temperature-dependent viscosity as claimed in claim 2, characterized in that the diameter of the rear end hole of said passage is limited to 4–6 mm; the gradient up to said front end hole is set within a range of $1/16.5$–$1/33$; the passage surface is mirror-finished; and thereby the resin is prevented from staying inside, and moreover, the nozzle port of said nozzle tip is set to a gradient of $1/5$–$1/15$ steeper than that of the passage so that the solidified resin in said passage is thoroughly drawn and removed.

7. An injection-molding nozzle for resin with highly temperature-dependent viscosity as claimed in claim 3, characterized in that the diameter of the rear end hole of said passage is limited to 4–6 mm; the gradient up to said front end hole is set within a range of $1/16.5$–$1/33$; the passage surface is mirror-finished; and thereby the resin is prevented from staying inside, and moreover, the nozzle port of said nozzle tip is set to a gradient of $1/5$–$1/15$ steeper than that of the passage so that the solidified resin in said passage is thoroughly drawn and removed.

8. An injection-molding nozzle for resin with highly temperature-dependent viscosity as claimed in claim 2, characterized in that a heat insulating board provided with a through-hole of the same diameter drilled at the center as the diameter of the front end hole of said passage and the internal diameter of said nozzle port is interposed between the front end face of said nozzle main body and said nozzle tip.

9. An injection-molding nozzle for resin with highly temperature-dependent viscosity as claimed in claim 3, characterized in that a heat insulating board provided with a through-hole of the same diameter drilled at the center as the diameter of the front end hole of said passage and the internal diameter of said nozzle port is interposed between the front end face of said nozzle main body and said nozzle tip.

10. An injection-molding nozzle for resin with highly temperature-dependent viscosity as claimed in claim 4, characterized in that a heat insulating board provided with a through-hole of the same diameter drilled at the center as the diameter of the front end hole of said passage and the internal diameter of said nozzle port is interposed between the front end face of said nozzle main body and said nozzle tip.

* * * * *